Sept. 10, 1957 W. L. SAUVAGO 2,805,883
SHEATHED GAFF
Filed Feb. 20, 1956

INVENTOR.
WILLARD L. SAUVAGO
BY
M. Talbert Dick
ATTORNEY

Witness.
A. G. Martin

2,805,883
SHEATHED GAFF

Willard L. Sauvago, Coon Rapids, Iowa

Application February 20, 1956, Serial No. 566,408

5 Claims. (Cl. 294—26)

This invention relates to a gaff hook and more particularly to one that remains safely sheathed until placed in actual use.

The use of hook gaffs is very old. They are mostly used in fishing for catching onto and/or lifting the fish from the water after it has been drawn into the vicinity of the fisherman by the rod and line. Most such gaffs are of two parts, i. e., a grip handle portion and a curved sharpened hook member extending from the handle. These gaffs, while most useful for controlling fish, are dangerous. Due to their barbed end they can not be safely carried in the pocket.

Therefore, one of the principal objects of my invention is to provide a gaff that remains sheathed until the moment its pointed end is ready to penetrate the fish or like.

More specifically the object of this invention is to provide a sheathed gaff that will remain sheathed until it comes into contact with the object to be hooked.

A still further object of my invention is to provide a gaff hook that is in contracted or in compact condition until time of usage.

Still further objects of my invention are to provide a hook gaff that is economical in manufacture, durable in use, and refined in appearance.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Figure 1:
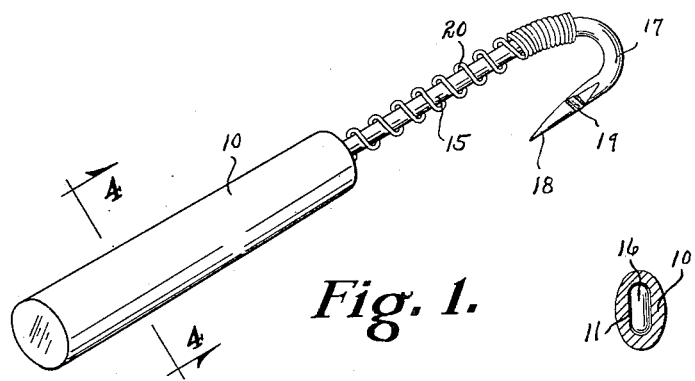
Fig. 1 is a perspective view of my gaff hook in unsheathed condition.
Figure 4:
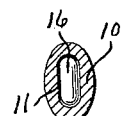
Fig. 4 is a cross sectional view of the device taken on line 4—4 of Fig. 1.
Figure 2:
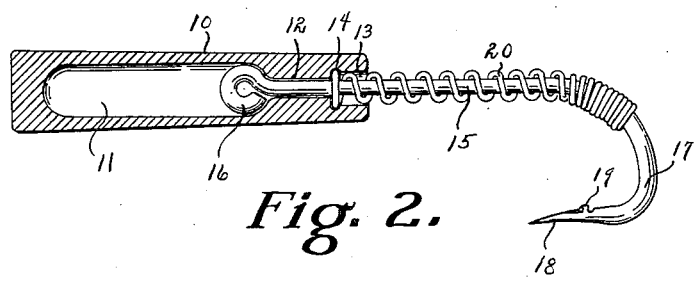
Fig. 2 is a side view of the device with a section of the handle cut away to more fully illustrate its construction.
Figure 3:
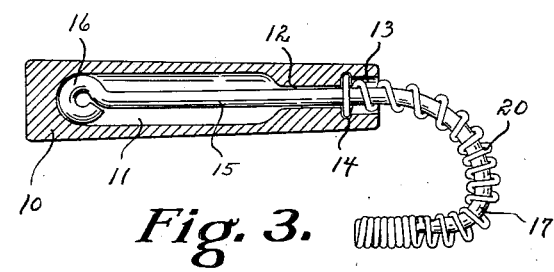
Fig. 3 is a side sectional view of the gaff in sheathed condition.

In these drawings I have used the numeral 10 to generally designate the handle portion having hollow compartment 11. This compartment 11 when viewed from either end is vertically greater than it is horizontally wide, as shown in Fig. 4. The numeral 12 designates a bore in the forward end portion of the handle 10 having its rear end communicating with the compartment 11, as shown in Fig. 2. The numeral 13 designates a cup opening in the extreme forward end of the handle communicating with the forward end of the bore 12. The numeral 14 designates a ring recess in the wall of the cup opening. The numeral 15 designates the shaft of the gaff hook per se. This shaft slidably extends through the cup portion 13, the bore 12, and into the compartment 11, as shown in Fig. 3. The numeral 16 designates an eye or enlarged portion on the rear end of the shaft 15 and inside the compartment 11. This part 16 is slidable in the compartment 11, but is of such size as to be prevented from independent rotation relative to the handle, thus holding the shaft 15 from independent rotation relative to the handle. The outer end of the shaft is curved to form the hook end 17 and to terminate in the sharpened barbed point 18. This point end 18 extends rearwardly and has a lug 19, as shown in Fig. 2. The numeral 20 designates a normally straight coil spring loosely embracing the shaft 15, and having its rear end extending into the cup portion and held therein by engagement with the groove ring 14. The outer end portion of this spring is closely wound, as shown in Fig. 3. To sheathe the hook portion 17, it is merely manually forced rearwardly relative to the handle 10. The coil spring is of such length that it is forced thereby to curve and slidably embrace the hook portion 17 and barb end 18 and very little of the shaft 15, as shown in Fig. 2. The tight coiled outer end of the coil spring will embrace the pointed end 18 thereby shielding the same. The shaft portion will be substantially telescoped within the handle and therefore the unit will be quite compact for carrying. By the spring having its length curved from that of a straight line, it will yieldingly exert a pressure to straighten out, which if permitted would cause its sliding action back on the shaft 15 and thereby sliding the shaft or gaff portion forwardly from the handle to an effective open expanded condition. To normally prevent this action, the lug 19 engages the spring as shown in Fig. 3 and thereby yieldingly holds the device in telescoped sheathed condition.

Therefore, to use the device, the handle 10 is grasped in the usual way. The hooked end is placed onto the object to be hooked and the handle jerked rearwardly. With the free end of the spring in engagement with the object to be hooked, the spring will be forced out of engagement with the lug 19, and the spring in its inclination to assume a straight line will slide the shaft 15 forwardly relative to the handle, thereby exposing the entire outer effective end of the gaff, as shown in Fig. 2. The end 16 will prevent the complete withdrawal of the shaft from the handle. After use, the device is again telescoped to bring the tight outer coils of the spring around and over the barbed end and the lug 19 between the loose coils of the spring adjacent the outer end tight coils. The outer tight coils of the spring are so close together that the lug 19 has no effect thereon and therefore once the lug is past the loose coils, the spring is free to move to a straight condition, sliding over the hooked outer end of the gaff.

Some changes may be made in the construction and arrangement of my sheathed gaff without departing from the real spirit and purpose of my invention, and it is my intention to cover by my claims, any modified forms of structure or use of mechanical equivalents which may be reasonably included within their scope.

I claim:

1. In a gaff, a handle portion, a shaft having its rear end portion slidably mounted on said handle portion and having its forward portion in the form of a curved hook terminating in a sharpened point end, a means for limiting the sliding movement of said shaft outwardly from said handle portion, and a normally straight coil spring slidably embracing said shaft and having its rear end secured to said handle portion and its free forward end capable of embracing the sharpened point end area of the said shaft when said shaft is slid rearwardly on said handle portion.

2. In a gaff, a handle portion, a shaft having its rear end portion slidably mounted on said handle portion and having its forward portion in the form of a curved hook terminating in a sharpened point end, a means for limiting the sliding movement of said shaft outwardly from said handle portion, a normally straight coil spring slidably embracing said shaft and having its rear end secured to said handle portion and its free forward end capable of embracing the sharpened point end area of the said shaft when said shaft is slid rearwardly on said handle portion, and a lug on said shaft in the vicinity of said sharpened pointed end capable of being yieldingly engaged by said coil spring for preventing accidental sliding action of said spring relative to said shaft.

3. In a gaff, a handle portion, a shaft having its rear end portion slidably mounted on said handle portion and having its forward portion in the form of a curved hook terminating in a sharpened point end, a means for limiting the sliding movement of said shaft outwardly from said handle portion, a normally straight coil spring slidably embracing said shaft and having its rear end secured to said handle portion and its free forward end capable of embracing the sharpened point end area of the said shaft when said shaft is slid rearwardly on said handle portion, and a lug on said shaft in the vicinity of said sharpened pointed end capable of being yieldingly engaged by said coil spring for preventing accidental sliding action of said spring relative to said shaft; said coil spring having its outer free end portion of tightly wound coils.

4. In a gaff, a handle portion, a shaft having its rear end portion slidably mounted on said handle portion and having its forward portion in the form of a curved hook terminating in a sharpened point end, a normally straight coil spring slidably embracing said shaft and having its rear end secured to said handle portion and its free forward end capable of embracing the sharpened point end area of the said shaft when said shaft is slid rearwardly on said handle portion, a lug on said shaft in the vicinity of said sharpened pointed end capable of being yieldingly engaged by said coil spring for preventing accidental sliding action of said spring relative to said shaft, and a means for limiting the sliding movement of said shaft in two directions relative to said handle portion.

5. In a gaff, a handle portion, a shaft having its rear end portion slidably mounted on said handle portion and having its forward portion in the form of a curved hook terminating in a sharpened point end, a normally straight coil spring slidably embracing said shaft and having its rear end secured to said handle portion and its free forward end capable of embracing the sharpened point end area of the said shaft when said shaft is slid rearwardly on said handle portion, a means for preventing the rotation of said shaft relative to said handle portion, and a two way stop means for limiting the sliding movement of said shaft relative to said handle portion.

References Cited in the file of this patent

UNITED STATES PATENTS

| | | |
|---|---|---|
| 1,305,175 | Smith | May 27, 1919 |
| 1,623,497 | Rurup | Apr. 5, 1927 |
| 2,570,538 | Fincher et al. | Oct. 9, 1951 |